United States Patent Office 2,914,091
Patented Nov. 24, 1959

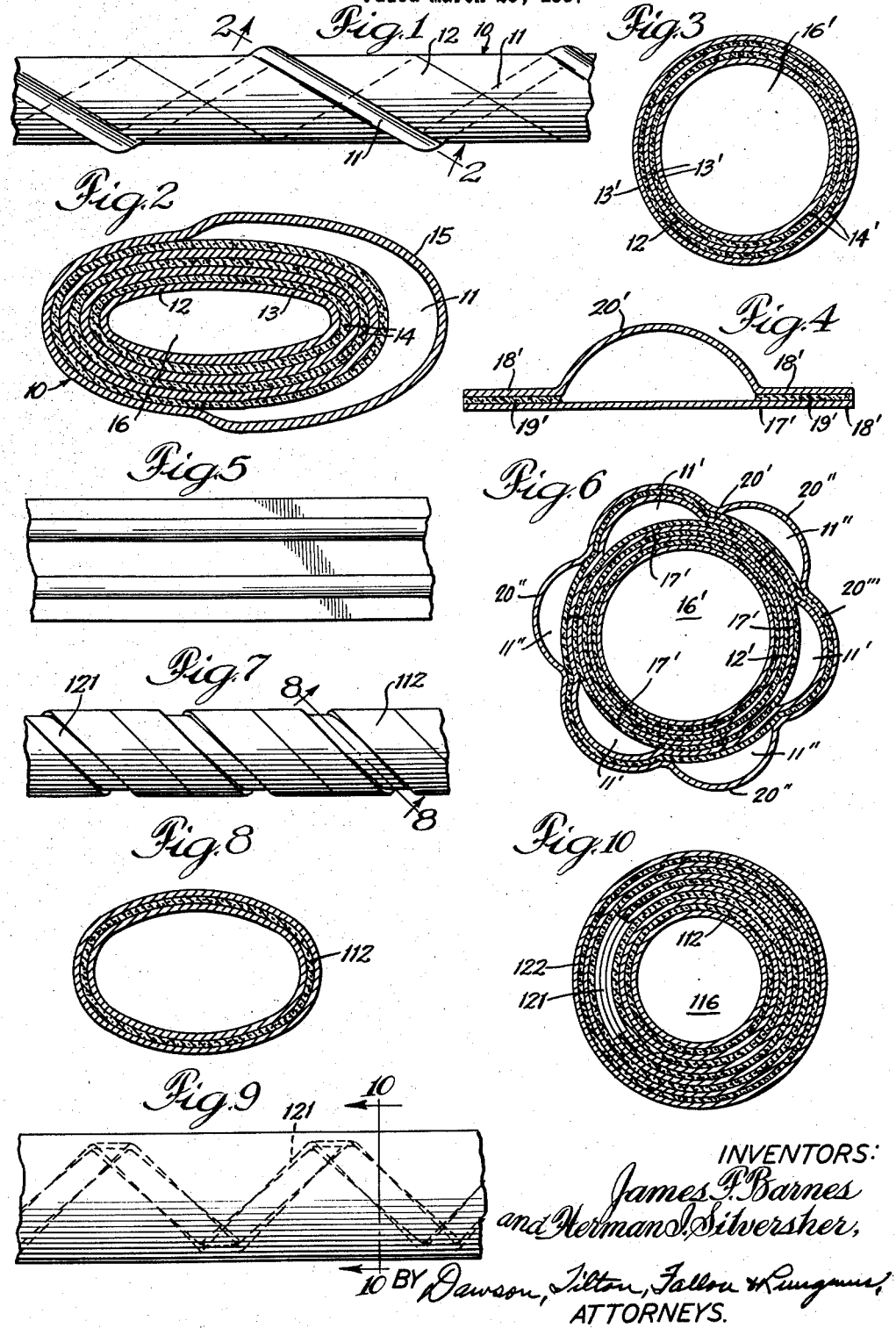

2,914,091

MULTIPLE PASSAGE PIPE

James F. Barnes, Van Nuys, and Herman I. Silversher, Tujunga, Calif., assignors to Foil Process Corporation, Van Nuys, Calif., a corporation of California Application March 25, 1957, Serial No. 648,333

7 Claims. (Cl. 138—87)

This invention relates to a multiple passage pipe and, more particularly, to a pipe constructed of a metal foil laminate.

Multiple passage pipes or tubes, in the past, have been found particularly useful for countercurrent flow of liquids. A conventional structure for achieving a multiple passage pipe involves the use of a longitudinally-extending divider within the pipe. Such a construction is difficult and expensive to fabricate. Because of the weight of metal involved for a pipe of any size, the weight is proportionately increased.

It is an object of our invention to provide a new pipe of multiple passage pipe or tube. Another object is to provide a multiple passage tube that avoids the disadvantages and objections of prior art structures. Another object is to provide a multiple passage tube constructed of a metal foil laminate. Still another object is to provide a multiple passage pipe constructed of a metal foil laminate wherein at least one additional passage is provided between adjacent foil layers of laminate. Yet another object of our invention is to provide a multiple passage tube constructed of metal foil layers spirally wound on each other and united by a metal bonding adhesive. Another object is to provide a multiple passage tube constructed of a spirally wound metal foil laminate wherein the laminated wall provides an additional lengthwise passage. Other objects and advantages of our invention will appear as this specification proceeds.

Our invention will be explained in conjunction with the attached drawing, in which—

Fig. 1 is a fragmentary elevational view of one form of multiple passage tube constructed in accordance with our invention; Fig. 2 is a cross-sectional view taken along the line 2—2 of Fig. 1; Fig. 3 is a cross-sectional view of a foil laminate tube which serves as the base for the form of our invention shown in Fig. 6; Fig. 4 is a cross-sectional view of a longitudinal segment applied to the structure of Fig. 3 to form the structure shown in Fig. 6; Fig. 5 is a fragmentary elevational view of the embodiment of our invention shown in Fig. 6; Fig. 6 is a second embodiment of our invention and is a view taken in cross section of a foil laminate tube built up in peripheral longitudinally-extending passages; Figs. 7–10 depict yet another embodiment of our invention and in which Fig. 7 is an elevational view of the partially-completed multiple passage tube shown in Fig. 10; Fig. 8 is a cross-sectional view taken along the line 8—8 of Fig. 7; Fig. 9 is a fragmentary elevational view of the completed embodiment of our invention shown in Fig. 10; and Fig. 10 is a cross-sectional view of yet another embodiment of our invention.

Referring now to the drawing, the numeral 10 designates a multiple passage pipe or tube as shown in Figs. 1 and 2. In Fig. 1, the numeral 11 designates a spirally or helically-disposed passage on the periphery of a foil laminate designated 12. Foil laminate 12, as shown in Fig. 2, is seen to include three concentric layers 13 of a metal foil bonded together by intervening layers of a metal bonding adhesive 14. The outermost foil layer 15 which provides helical passage 11 is spaced at longitudinally continuous portions from laminate 12. The innermost foil layer 13 of laminate 12 provides a central passage 16, which, like passage 11, extends lengthwise of tube 10.

Referring now to the embodiment of our invention set forth in Figs. 3–6, it is to be noted that primed numerals are employed to indicate elements which are similar to those found in the embodiment set forth in Figs. 1 and 2. In Fig. 3, the numeral 12' designates a metal foil laminate made up of three layers of metal foil 13' which are united by intervening layers of a metal bonding adhesive 14'. The innermost metal foil layer defines a cylindrical passage 16'. The structure shown in Fig. 3 provides the base for the embodiment of our invention shown in Fig. 6.

Referring now to Fig. 6, it is to be seen that a plurality of longitudinally-extending passages 11' are disposed about the periphery of laminate 12'. These passages 11' are provided, according to one procedure of our invention, by applying formed longitudinal segments 17' to the periphery of laminate 12'. A longitudinal segment 17' is shown in Fig. 4. In the embodiment shown in Fig. 6, three such segments are united to the periphery of laminate 12'. Each segment is seen to include a pair of metal foil strips 18' which are united together along longitudinal edges by a layer of a metal bonding adhesive 19'. One of the metal foil strips 18' is transversely deformed throughout its length as at 20' to provide an arcuately-shaped longitudinal passage.

In Fig. 6, the completed embodiment of our invention is seen to include six passages, three being designated 11' and three 11". Passages 11' are formed by segments 17' disposed immediately adjacent laminate 12', while the passages 11" are provided by a continuous sheet 20' deformed as at 20" and overlying the three segments 17', being bonded thereto by adhesive layer 20'''. Alternatively, the three passages 11" could be provided by employing three additional segments like 17' and applying them to the periphery of the formed tube having passages 11' and positioning them intermediate and exterior to the segments 17' providing passages 11'.

In the modification of our invention shown in Figs. 7–10, a spirally-wound foil laminate 112 forms a longitudinally-extending passage 116. By providing longitudinal spacing between the adjacent edges of one or more layers of foil during the spiral winding operation between the adjacent layers of a metal bonding adhesive, a spiral recess is formed in laminate 112 and is designated by the numeral 121. In Fig. 10, wherein the final product of this embodiment is pictured, it is to be noted that recess 121 has a thickness corresponding to two layers of foil and one layer of adhesive. Recess 121 is provided in the form of a longitudinally-extending spiral channel by subsequent overlying spiral windings designated 122. In the illustration given, the foil ribbons forming the innermost two layers as well as the ribbons forming the outermost two layers, are wrapped with their edges in overlapping relation, while the foil ribbons forming the intermediate two layers are wrapped with their edges in longitudinally-spaced relation. It will be understood that the foil ribbons used immediately below and above recess 121 should be substantially wider than the recess.

Any thin, flexible metal foil can be used for the purpose of this invention, although aluminum foil is preferred. However, any of the commercially available metal foils can be successfully employed. Commercially available metal foils include, in addition to aluminum, lead, tin, Inconel, stainless steel, copper, titanium and brass. Where corrosion resistance is desirable, either as against the fluids being transported or the environment in which the multiple passage tube is installed, the exposed foil layer can be formed of a foil such as stainless steel, Inconel, or titanium. Where heat-transferring properties are important, the foil layer constituting the heat transfer barrier can be copper or other metal foil having a high coefficient of heat conduction. The foil layers can range in thickness from 0.25 mil to as great as 5 mils. Both annealed and hard foils can be used, such as annealed and hard aluminum foil, and the annealed and hard foil can be combined.

Various adhesive materials can be employed while still achieving some of the advantages of this invention. Generally, the adhesive should be selected for its capacity to form a strong bond with metals, and particularly with aluminum. Suitable adhesives for some purposes include those falling within the classes of thermosetting resin adhesives, thermoplastic resin adhesives, and elastomeric adhesives. The thermosetting resin adhesives are preferred, and particularly the epoxy resin adhesives. Epoxy resin adhesives, on first application and when only partially secured, are flexible and resilient, while being curable by the application of heat to a condition of increased rigidity. Moreover, such adhesives function as good bonding agents whether or not they are completely cured to a rigid, infusible condition. A wide range of properties can be achieved with regard to the product either in its final condition or for intermediate processing operations, as described above.

The epoxy resin adhesives can be applied in the form of liquids, solvent solutions, or for short periods of time as hot solutions (melts), or melted B-stage powders. When the adhesive is used in the form of a solvent solution, the components of the adhesive can be dissolved in the suitable solvent and the solution applied to the foil. If desired, the adhesive solution can be applied to one surface of a foil strip and the solvent evaporated therefrom before the second strip is applied. The advantages of using epoxy resins include excellent adhesion to clean metal surfaces without complicated surface preparations. The hardening (or polymerization) mechanism is one of addition rather than condensation. This means that no by-products are formed to interrupt the long chain formations. These can be manifested in the formation of a gaseous pocket. Pressure must be employed to prevent this in laminates using condensation polymerized products, while only a minimum or contact pressure is adequate to produce a good epoxy film. Another advantage of this mechanism is the low shrinkage factor that does not tend to distort the desired structural dimensions.

One particularly suitable adhesive consists of the reaction product of an epoxy resin and a polyamide. These components can be heated individually to a temperature of 90 to 100° C. to soften them, then mixed and applied. Reaction between the two components gives a cross-linked polymer having characteristics of hardness and flexibility in curing time which vary with the mixing proportions and temperature or curing. Usually about a 65-35 mixture of epoxy resin and polyamide gives good results. These components can be dissolved in methylethyl ketone or toluene, xylene, or comparable solvents for application as solvent solutions. Among the commercially available epoxy adhesives which may be mentioned are the Epon adhesives VI and VII of Shell Chemical and the Araldite adhesives AN-101 and AN-104 of Ciba. However, the preferred adhesives for this invention are not limited to those prepared from the interaction of epoxy resins and polamides. They may also be made by reacting epoxy resins with amine hardeners and cross-linking agents. These in the main are the polyamides of various molecular weights as ethylenediamine, phenylenediamine, etc. Mixtures of polyamines and diamines can also be used.

A specific example of a thermosetting epoxy resin adhesive suitable for use in the present invention is formulated as follows: 60 parts by weight of Epon 1001 is dissolved in 30 parts of toluol and 30 parts of methylethyl ketone. A second mixture is formed from 32 parts of Polyamide 115, 11 parts toluol, and 3 parts butanol. 120 parts of the first mixture combined with 46 parts of the second mixture to form an epoxy resin adhesive solution contains 55.4% solids. This adhesive was used as is, but it can be thinned to a different consistency with a mixture of 5 parts toluol and 1 part butanol. If faster drying is desired, additional quantities of methylethyl ketone can be added. In the 55.4% solids concentrate, the adhesive mixture has a pot-life in excess of 12 hours and this can be increased by adding additional quantities of solvents. Epon 1001 is an epoxy resin manufactured by Shell Chemical Company, which has an epoxide equivalent of 450 to 525. Polyamide 115 is a condensation product of dilinoleic acid and ethyldiamine produced by General Mills.

As a specific example of a phenolic thermosetting resin adhesive which can be used in the practice of the present invention, the following is illustrative: 100 parts of Plyophen 169 is combined with 100 parts by weight of a 10% solution of Butvar B-76 in methylethyl ketone. Plyophen 169 is a phenolformaldehyde resin manufactured by Reichhold Chemicals, of White Plains, New York. The product contains 64 to 68% solids, the resin being dissolved in methanol. Butvar B-76 is a polyvinyl butyral resin in a 10% solids solution in methylethyl ketone. It is manufactured by the Monsanto Chemical Company. If desired, Paracril CV can be substituted for Butvar B-76. Paracril CV is rubbery solid butadiene-acrylonitrile copolymer manufactured by the Naugatuck Chemical Company, of Naugatuck, Connecticut. As modifiers for the phenolformaldehyde, soluble nylon or neoprene rubber can be used. Also, the formvar resins can be substituted for all or part of the Butvar B-76. The formvar resins are produced by the Shawinigan Chemical Company, of Springfield, Massachusetts.

As examplary of the practice of our invention, the following can be set down:

Example I

To provide the structure shown in Figs. 1 and 2, we take 3 strips of 5 mil aluminum foil. The innermost foil strip is of a hardened character, while the remaining 2 strips providing the second and third layers are annealed, or of a softened character. These are spirally wound on a mandrel employing the following metal bonding adhesive:

| Ingredients: | Parts by weight |
|---|---|
| Epon 1001 | 30 |
| Polyamide 115 | 16 |
| Methylethyl ketone | 15 |
| Toluol | 20 |
| Butanol | 1.4 |

The spirally wound assembly thus provided is then coated with another layer of the metal bonding adhesive and a fourth strip of aluminum metal foil of 5 mil thickness, after being suitably deformed, is spirally wound upon the assembly. The deformation of the last-mentioned foil strip can conveniently take the form designated 20' of Fig. 4, which refers to another embodiment of our invention. The plural passage tubing thus provided is then subjected to curing at 300° F. for 10 minutes in order to harden the metal bonding adhesive. The plural passage tube can be employed for countercurrent flow of liquids wherein a liquid to be cooled can be flowed in one passage and the cooling fluid in another. It is to be appreciated that where the fluid to be cooled is corrosive in nature, it can be conveniently flowed through passage 16 and the innermost spirally wound foil layer can be constructed of stainless steel or other corrosition-resistant foil.

Example II

For the cooling of a very hot liquid, an assembly of the character shown in Fig. 6 can be employed. Here, a three-ply spirally wound foil laminate tube is provided, the innermost foil layer which defines passage 16' being constructed of stainless steel of a 2 mil thickness. The foil layers are united by the interposition of layers of a phenol-polyvinyl butyral adhesive. A commercial example of such an adhesive in Bloomingdale's FM–47, which is manufactured by Bloomingdale Rubber Company, of Chester, Pennsylvania. The three-ply spirally wound laminate 12' of Fig. 6 then has applied another coating of adhesive. To this is applied three longitudinal segments 17' of the character shown in Fig. 4. The width of each longitudinal strip 17' is about one-third the circumference of laminate 12'. Three longitudinal segments 17' are disposed about laminate 12' to form three additional longitudinal passages, such as designated 11' in Fig. 6. Should additional longitudinal passages be desired in this embodiment, the four-passaged tube can thereafter be coated with another layer of adhesive and formed sheet 20' applied. The three additional passages 11" provided by sheet 20' are also disposed about the periphery of laminate 12' and are intermediate the already-provided passages 11'. Where rapid heat transfer is desirable from a corrosive liquid to a large quantity of coolant, all but the innermost layer of laminate 12' can be constructed of a copper foil and the embodiment shown in Fig. 6 can be employed where substantial passage area for coolant is provided. The structure of Fig. 6 is also desirable where liquids have to be heated but are not properly combinable, in which case the liquids to be heated can be flowed in passages 11' and 11" and, after heat-transfer relationship with a fluid flowing in passage 16', can be distributed as desired.

Example III

In the construction of the embodiment of our invention shown in Figs. 7–10, we provide a spirally wound laminate 112 substantially as in the previous embodiments. Where light weight is a primary consideration, we prefer to employ aluminum foil. A strong, lightweight spirally wound tube can be constructed of annealed aluminum strips having a thickness of 3 mils when adhesively bonded together by a suitable metal bonding adhesive. Such an adhesive consists of 83.4 parts of the epoxy-polyamide adhesive solution described above in Example I, combined with 20 parts of Butvar B–76. After two plies have been spirally wound, the third ply is added, but having a pitch length of twice that of the first two plies of laminate 112. Alternatively, it is possible to provide recess 121 in this embodiment by maintaining the pitch length in spiral winding at the same value, but using a narrower ribbon. Preferably, two such narrower ribbons are provided on laminate 112, properly united by the adhesive specified above. Overlying the four plies of foil provided thus far, we add one or more plies so as to convert recess 121 into the spirally-disposed passage shown in Figs. 9 and 10.

The foregoing detailed description has been given for clearness of understanding only, and no unnecessary limitations are to be inferred therefrom.

We claim:

1. A multiple passage tube, comprising a plurality of strips of metal foil spirally wound upon themselves and united with a metal bonding adhesive to form a spirally wound tube, an outer foil layer on said tube, said outer layer being deformed to form a passage extending longitudinally of said tube.

2. A multiple passage tube of the character set forth in claim 1, wherein said passage is a spiral.

3. A multiple passage tube of the character set forth in claim 1, wherein the said passage is straight and parallel to the axis of said tube.

4. A multiple passage tube of the character set forth in claim 1, wherein the said outer layer provides a plurality of parallel straight passages.

5. A multiple passage tube, comprising a plurality of strips of metal foil spirally wound upon themselves and united with a metal bonding adhesive to form a spirally wound tube, longitudinally continuous portions of one of said foil strips being spaced from an adjacent foil strip to provide a passage in the laminated wall of said tube.

6. A multiple passage tube of the character set forth in claim 5 in which the said wall passage is a spiral.

7. A multiple passage tube comprising a plurality of strips of metal foil spirally wound upon themselves and united with a metal bonding adhesive to form a spirally wound tube, said tube having at least outer, intermediate, and inner foil layers, the adjacent edges of the strip forming said intermediate layer being longitudinally-spaced apart to provide a spiral passage in the wall of said tube.

References Cited in the file of this patent

UNITED STATES PATENTS

| | | |
|---|---|---|
| 813,918 | Schmitz | Feb. 27, 1906 |
| 2,348,284 | Dunleavey | May 9, 1944 |